United States Patent Office 3,278,657
Patented Oct. 11, 1966

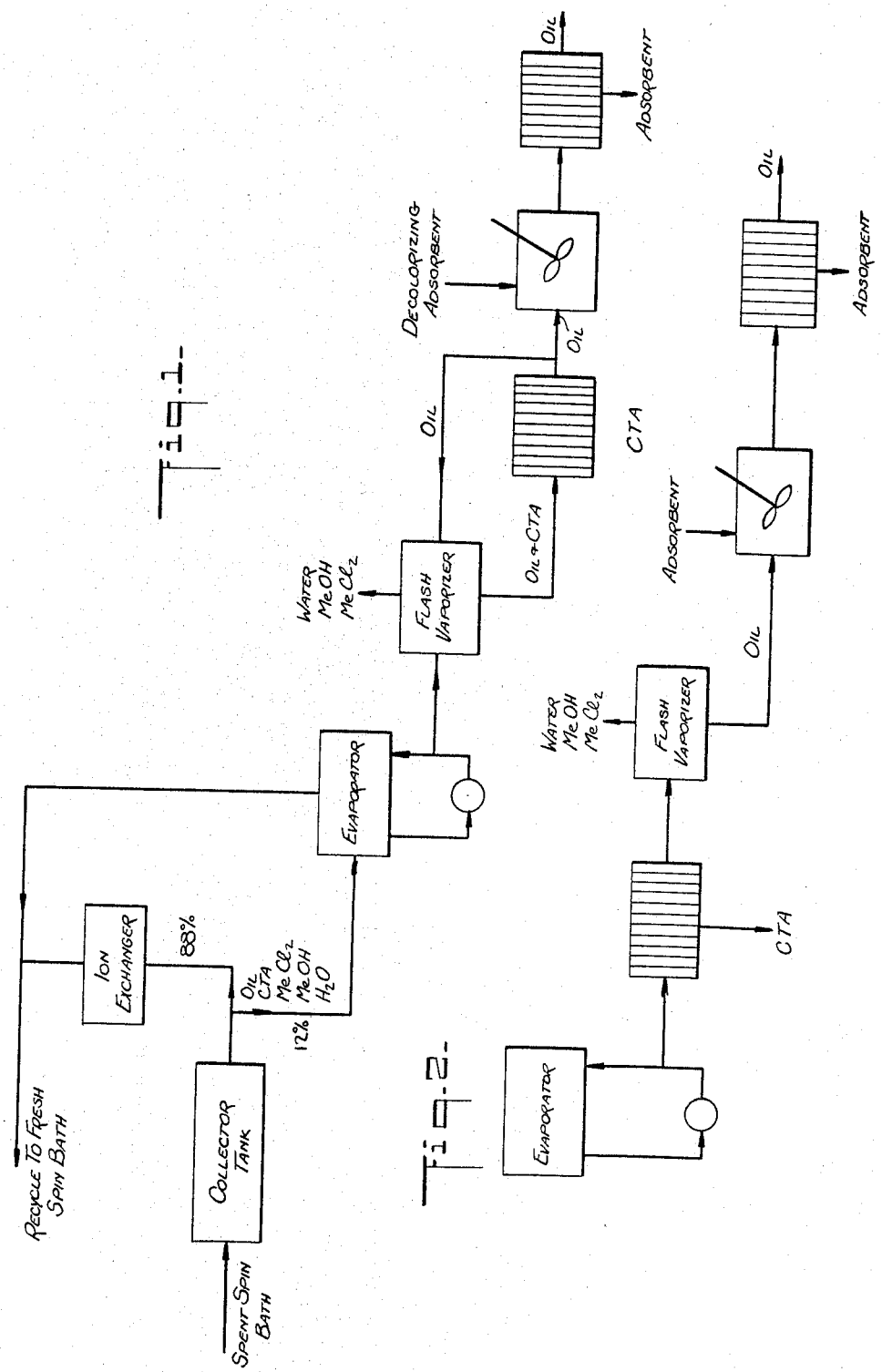

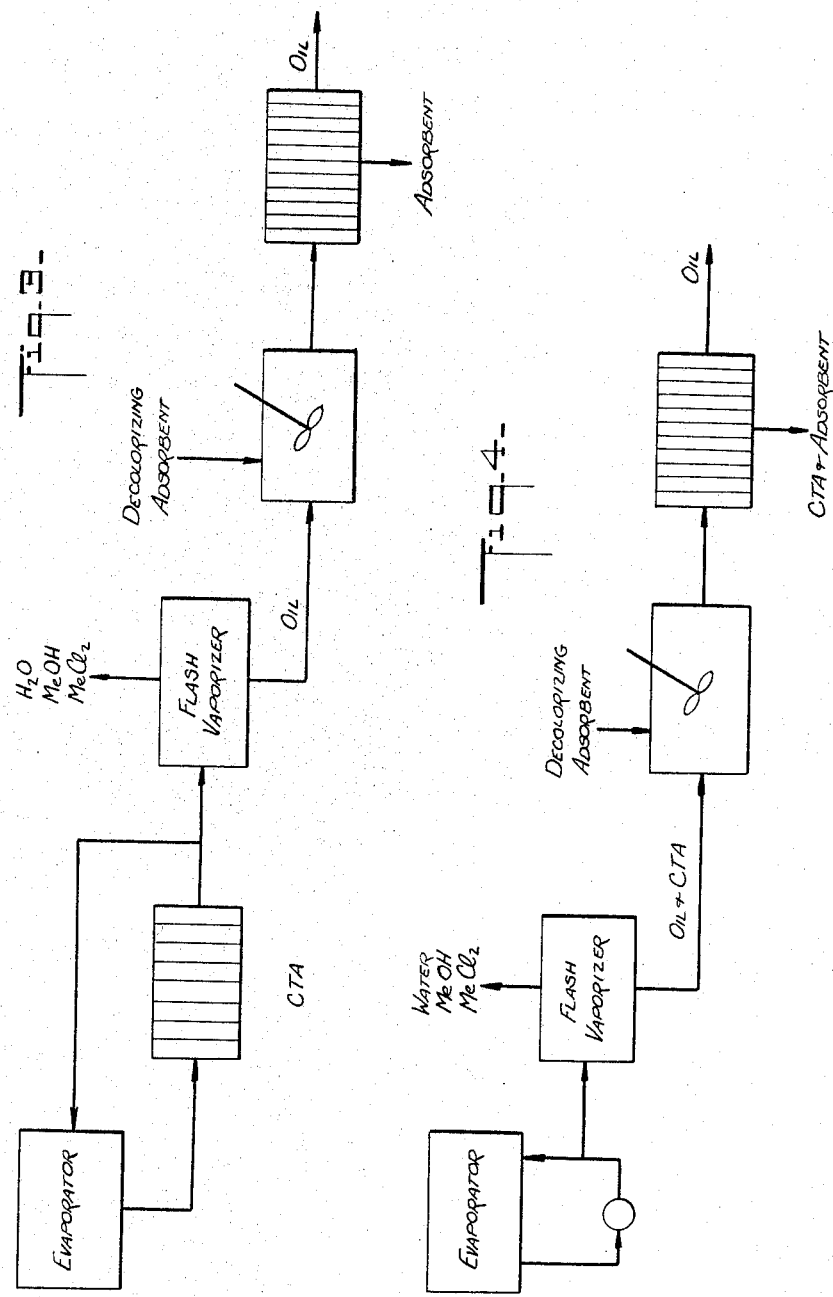

3,278,657
OIL RECOVERY IN WET-SPINNING PROCESS
James S. Clements, Gulf Breeze, Fla., and Kenneth C. Laughlin, Chester, Va., assignors to Celanese Corporation of America, New York, N.Y., a corporation of Delaware
Filed Aug. 22, 1962, Ser. No. 218,657
21 Claims. (Cl. 264—38)

This invention relates to a novel method for recovering oil which has been utilized in a wet-spinning process. More particularly, this invention relates to the removal and recovery of oil from the evaporator bottoms obtained from a spent spin bath, the bottoms containing oil, water, a cellulose triester, e.g., cellulose triacetate, and solvent, which process comprises subjecting the bottoms to evaporative conditions so as to drive off the water and solvent and leave a slurry of cellulose triester and oil, treating the slurry with a decolorizing agent to effect decolorization of the oil, and filtering the whole to remove the decolorized oil from the solids (cellulose triester and decolorizing agent). Alternatively, the sequence can be altered in that after removal of solvent and water, the cellulose triester-oil slurry is first filtered to remove the oil therefrom, and then the oil is treated with a decolorizing agent.

Wet-spinning of organic acid esters of cellulose containing fewer than about 0.29 free hydroxyl groups per anhydro glucose unit of the cellulose molecule, e.g., cellulose triacetate, is well known.

In U.S. patent application Serial No. 58,610, filed September 27, 1960, now abandoned, in the name of Cipriani et al., there is disclosed a method of wet-spinning filaments of cellulose triesters whereby coalescence of the wet spun filament is avoided, which method involves immersing a coagulated cellulose triester filamentary material produced by extrusion into a spin bath exerting a swelling action thereon. The spin bath which exerts such swelling action contains an organic compound having a molecular weight of at least about 200 (preferably about 300 to 1000), a melting point below about 50° C. (preferably below about 40° C.), and a boiling point above about 200° C. (preferably above about 250° C.). Such organic compound must be soluble in cellulose triacetate to the extent of less than about 10% and preferably less than about 5% by weight. Representative organic compounds include higher alkyl esters such as lauryl acetate and the like, esters such as glycerides of higher fatty acids containing preferably only carbon, hydrogen and oxygen such as stearic, oleic, linoleic, and like acids, poly-lower alkylene glycols such as polyethylene glycol, polypropylene glycol, etc. preferably having molecular weights of from about 600 to 1000 and ethers or esters thereof, silicone oils such as poly-dimethyl siloxane, and hydrocarbon oils.

Of the foregoing compounds, hydrocarbon oils are preferred since they effect a marked improvement in processability. Desirably, the hydrocarbon oil is a white mineral oil having an essentially aliphatic base, such as paraffinic or naphthenic base, and having a viscosity of about 30 to 400 seconds as measured at 38° C. (100° F.) in the Saybolt Universal viscosimeter, and preferably a viscosity of about 40 to 100 seconds. Its molecular weight desirably ranges from about 175 to 400 and preferably about 200 to 300. Its initial boiling point generally is in excess of about 200° C. and preferably in excess of about 250° C. and its vapor pressure is generally less than about 0.1 mm. Hg at 38° C.

As described in detail in aforesaid patent application Serial No. 58,610, the hydrocarbon oil is desirably present during the actual formation of filaments, as being present in the spin bath and/or in the dope. Alternatively, the hydrocarbon oil may be applied to the filament in a bath subsequent to the spinning apparatus.

Where the hydrocarbon oil is included in the spin bath it is generally present in about 0.1 to 3% and preferably 0.5 to 1%, based on the weight of the spin bath. Such concentrations are generally sufficient to leave about 0.1 to 5% and preferably about 0.5 to 2% of hydrocarbon oil on the filaments based on the dry weight of the filament.

After the wet filaments carrying the hydrocarbon oil leave the spinning apparatus the spent spin bath will typically contain cellulose triester, e.g., cellulose triacetate (which is of relatively low molecular weight and hence not capable of forming fibers), hydrocarbon oil, water, and solvent, the solvent generally being a mixture of methylene chloride and methanol.

Heretofore, it had not been thought feasible to attempt to recover the hydrocarbon oil from the spent spin bath mixture. The development of a suitable method for effecting such oil recovery would, of course, offer obvious economic advantage in that the recovered oil could be reused in the spinning process by merely recycling such oil to the spin bath make-up.

Accordingly, it is an object of the present invention to provide a method of recovering hydrocarbon oil from a spent spin bath mixture containing such oil, cellulose triester, water, and solvent.

Another object is to provide a novel bath method for effecting such oil recovery.

Yet another object is to provide a novel and economically advantageous continuous method for effecting such oil recovery.

Additional objects will become apparent hereinafter.

Our invention will be best understood by a consideration of the following detailed description, taken in conjunction with the accompanying drawing, wherein:

FIG. 1 is a schematic flow sheet showing one embodiment of the process of our invention; and FIGS. 2–4 are schematic flow sheets showing alternative embodiments of the process of our invention.

After the wet filaments carrying the hydrocarbon oil are removed from the spin bath there remains in the spent spin bath cellulose triester, e.g., cellulose triacetate, oil, water, and solvent (typically a mixture of methylene chloride and methanol). The spent spin bath is removed from the collector tank and desirable is divided into two streams (FIG. 1). One of these streams may be treated with appropriate ion exchange material to remove impurities therefrom, and then may be recycled to the make-up for fresh spin bath.

The other stream leaving the collector tank is generally passed to an evaporator which drives off some solvent and water, leaving as bottoms cellulose triacetate and the hydrocarbon oil. The evaporizate is then added to the ion-exchanged material and both are recycled to the fresh spin bath make-up.

The proportion of spent spin bath which is directly treated with ion-exchange material as compared to the proportion of spent spin bath which is passed to the evaporator may of course vary, depending upon the amount of excess bath which must be removed from the bath circuit. Thus, as spin bath passes through the extrusion process it picks up solids from the dope and also gains in methylene chloride from the dope solvents. Methanol is added to the bath to adjust for the methylene chloride picked up. Accordingly, there results a net increase in the amount of bath unless the vaporization losses and bath carried on the tow are quite high. This excess bath to be removed from the bath circuit generally amounts to from about 1 to 5 percent of the bath flowing to the extrusion machine. Removal of a portion of the bath also serves to remove some of the solids picked up by the bath. The equilibrium solids content of the circulating bath is thus adjusted by controlling the amount of bath removed. Generally it is preferred to maintain the bath solids below about 0.12 percent in the bath, and this is effected by removing from about 12 to 15 percent of the bath and passing such amount to the evaporator. Of course, if higher or lower solids contents are derived, this proportion may be adjusted by passing to the evaporator from a minimum of 1 to 5 percent (referred to previously) up to 100 percent.

The evaporator bottoms typically comprise a mixture containing from about 1 to 15% cellulose triacetate, from about 4 to 50% hydrocarbon oil, from about 1 to 3% water, from about 27 to 74% methanol, and from about 7 to 18% methylene chloride. It is with respect to the recovery of the oil from this mixture that our invention finds application.

The process of our invention lends itself to either batch or continuous operation. Thus, in accordance with one aspect of our invention, a batch process can be utilized to recover oil from the solution of cellulose triacetate, oil, water, methanol and methylene chloride. In this batch process the five component mixture is first passed to a steaming oven, which causes the relatively volatile methylene chloride and methanol to be stripped off, leaving only oil, cellulose triacetate and water remaining.

It is convenient to place the evaporator contents in an open container, then place the container in a steaming oven and seal the oven. Low pressure steam (e.g., one half p.s.i.g.) is then passed into the oven for from about 18 to 24 hours. The steam and the vaporized solvents pass out the top of the oven to a condenser. The oil, cellulose triacetate solids, and residual water remain in the container.

The cellulose triacetate solids agglomerate into a dense cake. The water and steam condensate form an immiscible layer at the bottom of the oven, with the oil layer on top thereof. Accordingly, the mixture is first strained to thereby remove the cake of cellulose triacetate solids. The remaining oil and water mixture is immiscible, so that the oil can be decanted therefrom.

Before the oil can be recycled, it must be decolorized, since otherwise the color values would adversely affect the spin bath. Decolorization is desirably carried out by treating the oil with an appropriate decolorizing adsorbent such as Fuller's earth, decolorizing charcoal or the like.

Decolorization can be effected by a percolation method, wherein the decolorizing adsorbent, usually in granular form, is held in a fixed bed and the oil is caused to flow through the bed.

Preferably, however, decolorization of the oil is effected by constant filtration, wherein the finely divided adsorbent is added to the oil, the mixture is agitated, and the oil is recovered by filtration or by a combination of settling and filtration.

The decolorizing treatment can be carried out at either about room temperature or at elevated temperatures, as desired. We prefer room temperature since then there is no need to provide inert gas blanketing, which would be required at elevated temperatures so as to prevent oxidation.

The amount of adsorbent used is generally from about 5 to 15 percent by weight, based on the amount of oil present. A more preferred range is from about 6 to 10 percent.

Any of the conventional decolorizing adsorbents are suitable. We have found that decolorizing carbons and Fuller's earth are particularly desirable.

The particle size of the adsorbent may vary within considerable limits. Best results are obtained, however, when the particle size is at least 100% through 100 mesh and preferably 90 to 100% through 200 mesh.

There results a decolorized hydrocarbon oil that is clear in appearance and has an APHA color rating not higher than about 15, which oil is eminently suitable for recycle.

The method of our invention also finds application in a continuous operation. In accordance with one embodiment of our continuous process, a portion of the five component mixture from the evaporator bottoms, which mixture contains cellulose triacetate, oil, water, and methylene chloride, is passed directly to a flash vaporizor (FIG. 1). As shown in each of FIGS. 1–4, a portion of the evaporator bottoms is recycled back to the evaporator, either directly as shown in FIGS. 1, 2 and 4, or after filtration as shown in FIG. 3. This recycling provides agitation through the pump and pipe lines and hence prevents the solids from settling.

We have found that steam jacketed vaporizers of the thin film type are particularly suitable. The residence time may vary but generally is from about 10 seconds to one minute. The vaporizer ordinarily operates at atmospheric pressure. Steam is supplied to the jacket, generally at from about 50 to 75 p.s.i.g. The flash vaporizer drives off the water, methanol and methylene chloride, so that only oil and cellulose triacetate remain. The oil and cellulose triacetate bottoms are then passed through a contact filter in order to remove the cellulose triacetate.

A large portion, i.e., over 50% and preferably over 90%, of the oil filtrate is returned to the flash vaporizer. The purpose of the resultant large circulating flow through the filter is to keep the solids content of the flash vaporizer low in order to prevent plugging and fouling of the equipment.

A small portion of the oil filtrate, i.e. less than 50% and preferably less than 10% is passed on to the mixing tank, decolorizing adsorbent is added thereto, and after suitable agitation of the mixture, the decolorized oil is filtered from the adsorbent. With this embodiment there is no need to subsequently separate the decolorizing adsorbent from the cellulose triacetate. Such embodiment does require two filter steps, the first of which removes the triacetate from the oil, the second of which removes the oil from the decolorizing adsorbent.

Another embodiment of our invention is schematically illustrated in FIG. 2. This embodiment is similar to the embodiment illustrated in FIG. 1 in that the stream withdrawn from the evaporator is divided into two portions, one of which is recycled, while the other is removed for treatment in accordance with our process. The sequence of such treatment is altered, however, in that the portion to be treated in accordance with our process, which portion includes oil, cellulose triacetate, water, methylene chloride, and methanol, is first passed through a filter in order to effect removal of cellulose triacetate. Of course, caked cellulose triacetate so removed is swollen by and hence contains a considerable amount of solvent and hydrocarbon oil. The filtrate is then passed to the flash vaporizer to effect removal of all remaining methanol, methylene chloride, and water. The residue from the vaporizer consists essentially of hydrocarbon oil, but also contains minor amounts of triacetate solids. This residue is then fed to the mixing tank, a decolorizing adsorbent is added thereto, the whole is agitated, and then the oil is separated from solids (primarily decolorizing adsorbent but also containing cellulose triacetate) by filtering.

A further embodiment of our invention is schematically illustrated in FIG. 3. The sequence in this embodiment is very similar to that shown in FIG. 2, however, rather than passing only a portion of the evaporator contents through a filter (as was done in the embodiment illustrated in FIG. 2), the entire evaporator contents are passed therethrough, thereby removing most of the cellulose triacetate solids. The stream withdrawn from the filter is divided into two portions, the larger of which is recycled to the evaporator. In this embodiment (FIG.

3) it is desirable to maintain the evaporator contents at as low a solid content as possible. This is effected by continuously filtering a large volume of the evaporator contents and returning most of the filtrate to the evaporator. The other smaller stream is passed to the flash vaporizer to drive off water, methylene chloride and methanol, then to the mixing tank wherein decolorizing adsorbent is added, and finally to the filter to remove the adsorbent from the decolorized oil, which is now suitable for recycle.

Yet another embodiment is illustrated in FIG. 4. After the volatiles have been removed by flash evaporation, the oil and cellulose triacetate evaporator bottoms are passed to a mixing tank and Fuller's earth or other suitable decolorizing adsorbent is added thereto and the whole is subjected to agitation. Such treatment effectively decolorizes the hydrocarbon oil. The mixture is then removed from the mixing tank and passed through a contact filter, whereupon the cellulose triacetate solids and Fuller's earth are separated from the now purified and decolorized hydrocarbon oil, which can then be recycled.

While any of the four above described embodiments is suitable for a continuous process, we prefer that embodiment illustrated in FIG. 1. In this embodiment the solvent (methylene chloride and methanol) is removed prior to the filtration step wherein the oil is separated from the cellulose triacetate solids. Such sequence insures that the cellulose triacetate will be essentially granular (i.e., unswollen with solvent) and hence easy to handle and to filter.

In order to maximize the efficiency in recovering hydrocarbon oil, cellulose triacetate cake formed during our process, which cake contains about 40% oil, can be subjected to solvent washing whereby one can recover much of the oil contained therein. Of course, where the cellulose triacetate cake also is swollen with solvent (FIGS. 2 and 3), a simple washing of the cake with solvent is not suitable since the wash liquor will contain water plus a high solids level. Accordingly, we prefer to drive off solvent and water prior to filtration (either by our batch process or by the continuous-process embodiments illustrated in FIGS. 1 and 4), in which case the cake of cellulose triacetate obtained contains oil but no solvent.

Extraction of the oil from the cellulose triacetate cake can be readily effected. A particularly convenient solvent is a mixture of methanol and methylene chloride, for this solvent mixture is also utilized in the spinning process. The extraction is generally carried out by agitating the cellulose triacetate cake in the solvent for several minutes, filtering, and repeating the extraction with fresh solvent until all of the oil has been extracted.

We have found that two washings of the cellulose triacetate cake, using one part cake to ten parts of solvent (on a weight basis), the solvent generally being a 60–40 methanol-methylene chloride mixture, will extract about 95% of the oil from the cake. Without such oil extraction the overall oil recovery is about 75%. However, when oil is also extracted from the cake the overall efficiency rises to about 96%.

We have also found that where two filter cakes are produced the relative oil losses to these cakes are about 22.2% and 3.2%, respectively. Accordingly, by recovering oil in the first cake the overall efficiency is raised to about 96%. If the oil is also recovered from the second cake, the overall efficiency is raised to about 99%.

The following examples will further illustrate our invention. All parts are by weight unless otherwise stated.

Example 1

This examples shows the applicability of our invention to a batch process. 73.2 pounds of evaporator contents having the following composition were charged into a drum:

|  | Pounds | Percent |
|---|---|---|
| Oil (Textolene B-50 mineral oil) | 11.7 | 16.0 |
| Methanol | 45.5 | 62.1 |
| Methylene Chloride | 11.4 | 15.6 |
| Cellulose Triacetate Solids | 3.9 | 5.3 |
| Water | 0.7 | 1.0 |
| Total | 73.2 | 100.0 |

The drum was placed in a steaming oven and was retained in the oven (temperature 100° C., pressure 0.5 p.s.i.g., for 24 hours, whereupon all of the methanol and methylene chloride were evaporated off. The residue included 11.7 pounds of oil, 3.9 pounds of cellulose triacetate, and 1 pound of water. The triacetate agglomerated into a dense cake while the water and steam condensate formed an immiscible layer in the bottom of the drum. 9.1 pounds of oil were recovered therefrom by straining out the cellulose triacetate via a ¼ inch mesh screen. Thereafter the oil was treated with one pound of Fuller's earth and the mixture was agitated. After twenty-five minutes the decolorized oil was filtered from the Fuller's earth.

8.73 pounds of oil were recovered, which is equivalent to a percent recovery of 74.6%.

The cake of cellulose triacetate, which weighted 6.5 pounds, contained therein 2.6 pounds of oil. In order to recover this oil the cake was treated with a wash solution of 65 pounds of 60/40 methanol/methylene chloride and the whole was agitated for about 10 minutes at ambient temperatures. The solvent (and oil dissolved therein) was filtered off. The cake was again washed with 65 pounds of fresh wash solution and filtered. The two wash solutions were combined and the solvent evaporated therefrom, leaving a bottoms of 2.44 pounds of oil. (Alternatively, rather than evaporating off the solvent from the wash solutions to recover the oil, a countercurrent stagewise reaction can be employed. This results in a higher concentration of oil in the extractive solvent, and the resulting solution can be decolorized and then recycled.)

Thus, the overall efficiency of oil recovery was 95.4 percent.

The oil so recovered compares very favorably with virgin oil, as shown by the following comparative data.

|  | Percent Oil | Percent Volatiles | Percent $H_2O$ | Color* | Color, APHA |
|---|---|---|---|---|---|
| Recovered oil | 99.84 | 0.15 | 0.006 | 98 | 15 |
| Virgin oil | 99.998 | 0.002 | 0.000 | 100 | 5 |

|  | Appearance | Acidity, Percent Oleic | Sap. No. |
|---|---|---|---|
| Recovered oil | Clear | 0.003 | 0.14 |
| Virgin oil | do | 0.001 | 0.02 |

*Percent transmittance compared to virgin oil using Lumltron Colorimeter.

Example 2

This example shows the applicability of our invention to a continuous process, as schematically illustrated in FIG. 1. 73.2 pounds per hour of evaporator bottoms having the following composition were obtained:

|  | Pounds Per Per Hour | Percent |
|---|---|---|
| Oil (Textolene B-50 mineral oil) | 11.7 | 16.0 |
| Methanol | 45.5 | 62.1 |
| Methylene Chloride | 11.4 | 15.6 |
| Cellulose Triacetate Solids | 3.9 | 5.3 |
| Water | 0.7 | 1.0 |
| Total | 73.2 | 100.0 |

This stream was passed to a thin film type steam jacketed flash vaporizor (Kontro Adjust-O-Film Heat Exchanger) operated at a temperature of about 50 p.s.i.g. steam or 275–280° F. The residence time of the stream within the vaporizor was about 15 seconds. Atmospheric pressure existed in the vaporizor.

From the top of the vaporizor there was removed a stream at a rate of 57.6 pounds per hour, which stream contained methanol, methylene chloride, and water, and had the following composition:

|  | Pounds Per Hour | Percent |
|---|---|---|
| Methanol | 45.5 | 70.9 |
| Methylene Chloride | 11.4 | 19.8 |
| Water | 0.7 | 1.2 |
| Total | 57.6 | 100.0 |

The evaporizate was then passed to a condenser, collected, and the solvents recovered therefrom.

From the bottom of the flash chamber a stream is withdrawn, passed through a filter (Sparkler, horizontal plate filter, medium coarse grade of paper dressing—volume about 20 gallons, ambient temperature as affected by hot oil passing through) and returned to the flash chamber. The stream withdrawn and fed to the filter had a composition as follows:

|  | Lb./hr. | Percent |
|---|---|---|
| Oil | 234 | 98.4 |
| Triacetate solids | 3.9 | 1.6 |
| Total | 237.9 | 100.0 |

The filter cake removed in this filtration consisted of:

|  | Lb./hr. | Percent |
|---|---|---|
| Oil | 2.6 | 39.8 |
| Triacetate solids | 3.9 | 60.2 |
| Total | 6.5 | 100.0 |

(Note that the cake was only removed at intervals, as required, and not continuously as might be inferred by the reference to "lb./hr.")

The filtrate consisted of:

|  | Lb./hr. | Percent |
|---|---|---|
| Oil | 231.4 | 100 |
| Triacetate solids | 0 | 0 |
| Total | 231.4 | 100 |

A small portion of this filtrate was withdrawn and fed to a mixing tank for decolorizing. This stream consisted of 9.1 lb./hr. of oil. The remainder of the filtrate, 222.3 lb./hr. of oil, was returned to the flash chamber. The purpose of the large circulating flow through the filter was to keep the solids content of the flash chamber low in order to prevent plugging problems.

In order to further improve the percent of oil recovery, the oil-containing solids cake obtained as residue from the first filtration, and containing 3.9 pounds triacetate solids and 2.6 pounds oil (each per hour), was subjected to two successive washing treatments using two 65 pound portions of a 60/40 methanol/methylene chloride wash solution. The oil-containing solvent solution was filtered off and then the solvents removed therefrom. The amount of oil recovered in this manner was 2.44 pounds per hour, so that the total oil recovery was raised to 95.4 percent.

We claim:

1. A method of removing and recovering oil from evaporator bottoms obtained from a spent spin bath solution, said bottoms containing a mixture of cellulose triester, oil, solvent and water, this method comprising evaporating off from said mixture said solvent and water to leave a residue of cellulose triester and oil, separating said oil from said cellulose triester, and treating said oil with a decolorizing adsorbent to thereby decolorize said oil.

2. The method of claim 1 wherein said cellulose triester is cellulose triacetate and said solvent is a mixture of methylene chloride and methanol.

3. A continuous method for removing and recovering oil from evaporator bottoms obtained from a spent spin bath solution, said bottoms containing a mixture of cellulose triester, oil, solvent and water, said method comprising charging said mixture to a zone of elevated temperature to heat said mixture and thereby evaporate off said water and solvent and leave as residue oil and cellulose triester, passing said oil and cellulose triester through a filter to thereby remove cellulose triester as residue, passing the oil filtrate from said filter to a decolorizing zone, adding a decolorizing adsorbent to said decolorizing zone and agitating to thereby decolorize said oil, and separating said adsorbent from said decolorized oil.

4. The method of claim 3 wherein said cellulose triester is cellulose triacetate and said solvent is a mixture of methylene chloride and methanol.

5. The method of claim 3 wherein the residence time within said elevated temperature zone is from about 10 seconds to one minute, the pressure in said zone is substantially atmospheric, and the temperature is from 275 to 280 degrees F.

6. The method of claim 3 wherein the decolorizing adsorbent is Fuller's earth having a particle size of at least 100 mesh.

7. A continuous method for removing and recovering oil from evaporator bottoms obtained from a spent spin bath solution, said bottoms containing a mixture of cellulose triester, oil, solvent and water, said method comprising charging said mixture to a zone of elevated temperature to heat said mixture and thereby evaporate off said water and solvent and leave as residue oil and cellulose triester, passing said oil and cellulose triester through a filter to thereby remove cellulose triester as residue, passing a major portion of said oil filtrate back to said zone of elevated temperature so that a relatively large circulating flow of oil is maintained through said zone of elevated temperature and through said filter whereby the solids content is kept low, passing the remaining minor portion of said oil filtrate to a decolorizing zone, adding a decolorizing adsorbent to said decolorizing zone and agitating to thereby decolorize said oil, and separating said adsorbent from said decolorized oil.

8. The method of claim 7 wherein said cellulose triester is cellulose triacetate and said solvent is a mixture of methylene chloride and methanol.

9. The method of claim 7 wherein the residence time within said elevated temperature zone is from about 10 seconds to one minute, the pressure in said zone is substantially atmospheric, and the temperature is from about 275 to 280 degrees F.

10. The method of claim 7 wherein the decolorizing adsorbent is Fuller's earth having a particle size of at least 100 mesh.

11. A continuous method for removing and recovering oil from evaporator bottoms obtained from a spent spin bath solution, said bottoms containing a mixture of cellulose triester, oil, solvent and water, said method comprising charging said mixture through a filter to thereby remove as residue said cellulose triester, charging the filtrate of oil, solvent and water from said filter to a zone of elevated temperature to thereby heat said mixture and evaporate off said water and solvent and leave as residue said oil, passing said oil to a decolorizing zone, adding a decolorizing adsorbent to said decolorizing zone and agitating to thereby decolorize said oil, and separating said decolorized oil from said adsorbent.

12. The method of claim 11 wherein said cellulose triester is cellulose triacetate and said solvent is a mixture of methylene chloride and methanol.

13. The method of claim 11 wherein the residence time within said elevated temperature zone is from about 10 seconds to one minute, the pressure in said zone is substantially atmospheric, and the temperature is from about 275 to 280 degrees F.

14. The method of claim 11 wherein the decolorizing adsorbent is Fuller's earth having a particle size of at least 100 mesh.

15. A contoinuous method for removing and recovering oil from evaporator bottoms obtained from a spent spin bath solution, said bottoms containing a mixture of cellulose triester, oil, solvent and water, said method comprising charging said mixture through a filter to thereby remove as residue said cellulose triester, passing a portion of said filtrate of solvent, water and oil back to the zone from which said evaporator bottoms were obtained, passing the remainder of said filtrate to a zone of elevated temperature to heat said mixture and thereby evaporate off said water and solvent and leave as residue said oil, passing said oil to a decolorizing zone, adding a decolorizing adsorbent to said decolorizing zone and agitating to thereby decolorize said oil, and separating said decolorized oil from said adsorbent.

16. The method of claim 15 wherein said cellulose triester is cellulose triacetate and said solvent is a mixture of methylene chloride and methanol.

17. The method of claim 15 wherein the residence time within said elevated temperature zone is from about 10 seconds to one minute, the pressure in said zone is substantially atmospheric, and the temperature is from about 275 to 280 degrees F.

18. The method of claim 15 wherein the decolorizing adsorbent is Fuller's earth having a particle size of at least 100 mesh.

19. A continuous method for removing and recovering oil from evaporator bottoms obtained from a spent spin bath solution, said bottoms containing a mixture of cellulose triester, oil, solvent and water, said method comprising charging said mixture to a zone of elevated temperature to heat said mixture and thereby evaporate off said water and solvent and leave as residue oil and cellulose triester, passing said oil and cellulose triester residue to a decolorizing zone, adding a decolorizing adsorbent to said decolorizing zone and agitating to thereby decolorize said oil, and separating said decolorized oil from said cellulose triester and adsorbent.

20. The method of claim 19 wherein the residence time within said elevated temperature zone is from about 10 seconds to one minute, the pressure in said zone is substantially atmospheric, and the temperature is from about 275 to 280 degrees F.

21. The process which comprises wet spinning a solution of cellulose triester in a solvent into a spin bath exerting a swelling action thereon to form swollen filaments, contacting the freshly formed swollen filaments with oil, collecting excess oil and spent spin bath as mixture, said mixture comprising solvent, water and finely divided cellulose triester solids, evaporating at least a portion of the mixture to remove most of the solvent therefrom and to leave evaporator bottoms containing cellulose triester, oil, solvent and water, evaporating off from said bottoms said solvent and water to leave a residue of cellulose triester and oil, separating said oil from said cellulose triester, treating said oil with a decolorizing adsorbent to thereby decolorize said oil, and recycling said oil for further contact with freshly formed swollen filaments.

References Cited by the Examiner

UNITED STATES PATENTS

| | | | |
|---|---|---|---|
| 1,960,698 | 5/1934 | Dietrich | 208—182 |
| 2,096,220 | 10/1937 | Wilbur | 208—182 |
| 2,459,409 | 1/1949 | Bjornstjerna | 208—179 |
| 2,830,012 | 4/1958 | Norris | 208—182 |
| 2,842,112 | 7/1958 | Philips et al. | 208—179 |
| 3,109,697 | 11/1963 | Cipriani et al. | 264—200 |

DELBERT E. GANTZ, *Primary Examiner.*

ALPHONSO D. SULLIVAN, H. LEVINE,
*Assistant Examiners.*